(12) United States Patent
Jackelen et al.

(10) Patent No.: US 6,823,147 B2
(45) Date of Patent: Nov. 23, 2004

(54) METHOD OF RESOLVING MISMATCHES BETWEEN PRINTER RESOURCES AND PRINT JOB REQUIREMENTS

(75) Inventors: Jeffrey A. Jackelen, Pittsford, NY (US); Michael P. Tompkins, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/232,633

(22) Filed: Aug. 30, 2002

(65) Prior Publication Data

US 2003/0053810 A1 Mar. 20, 2003

Related U.S. Application Data

(60) Provisional application No. 60/317,325, filed on Sep. 4, 2001.

(51) Int. Cl.[7] ................................................ G03G 15/00
(52) U.S. Cl. .............................. 399/16; 399/18; 399/19; 399/361
(58) Field of Search .............................. 358/1.14, 1.15; 399/16, 17, 18, 19, 361, 365

(56) References Cited

U.S. PATENT DOCUMENTS 5,129,639 A * 7/1992 DeHority ..................... 270/1.1

* cited by examiner

Primary Examiner—Hoang Ngo
(74) Attorney, Agent, or Firm—Richard A. Romanchik

(57) ABSTRACT

Methods for detecting mismatches between print job attributes and printer resources and capabilities that arise after rendering of the print job has begun but before rendering is complete. The method involves detecting the mismatch, placing the print job in a mismatch state and notifying the operator through the printer user interface that a given problem has occurred on a given page.

16 Claims, 2 Drawing Sheets

US 6,823,147 B2

METHOD OF RESOLVING MISMATCHES BETWEEN PRINTER RESOURCES AND PRINT JOB REQUIREMENTS

RELATED APPLICATION

This application claims priority to U.S. Provisional Patent Application No. 60/317,325, titled "Method of Resolving Mismatches Between Printer Resources and Print Job Requirements," which was filed on Sep. 4, 2001, and which is incorporated herein by reference in its entirety.

COPYRIGHT AUTHORIZATION

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The invention relates generally to methods and processes for digital electrographic printing. More specifically, the invention relates to methods of detecting and notifying a printer operator of a mismatch state resulting from an incompatibility between print job attributes and printer resources or capabilities when the mismatch state occurs "mid-job," i.e., after raster image processor has begun to render the print job.

BACKGROUND OF THE INVENTION

In order for a digital printer to successfully complete a print job, the print job attributes, such as specified media characteristics and finishing operations must be fully supported by the available printer resources and capabilities. That is, for example, the printer must support the necessary font, must be equipped with print media in the correct size and color and must be connected to the necessary finishing device to perform any required finishing operation. If the attributes specified by the print job are not supported by the printer, a "mismatch state" exists, and the printer will be unable to print the job, at least in the form the customer requested. The result is that the printer is either unable to print the job at all, or prints the job on different size paper, different color paper or without stapling or hole-punching the finished copies, for example.

Such a mismatch results in wasted time, in the case of a print job that cannot be run and requires reconfiguration of the print job attributes or printer resources, or in wasted time and money, in the case of print job being run on incorrect media or with incorrect or no finishing, requiring the print job to be completely re-run. Additionally, rendering by the raster image processor ("RIP") is a time consuming process and, therefore, many digital printers automatically check for potential mismatch conditions prior to initiating rendering.

Accordingly, there is a need in the art for a method of detecting mid-job mismatches and alerting the printer operator so that the mismatch may be remedied without the needless expenditure of time and printer resources.

SUMMARY

This invention solves these and other problems of current and prior art digital printers by providing a method of detecting mismatches during rendering of the print job and notifying the operator of the existence and nature of the mismatch state detected. Upon detection of a mid-job mismatch, the present invention stops rendering the print job, places the job in the printer in a mismatch state and displays on the printer's user interface a message informing the operator that a given problem was found on a given page.

These as well as other aspects and advantages of the present invention will become apparent from reading the following detailed description, with appropriate reference to the accompanying drawings.

BRIEF DESCRIPTION OF THE DRAWINGS

Preferred embodiments of the present invention are described herein with reference to the drawings, in which.

DETAILED DESCRIPTION OF PREFERRED EMBODIMENTS

Figure 1:
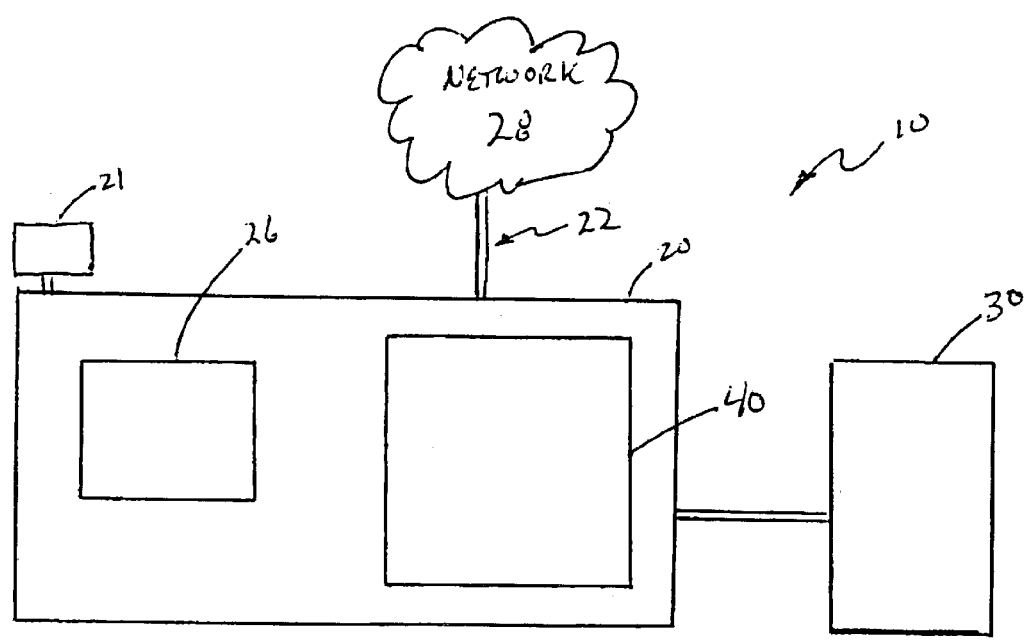
FIG. 1 presents a diagrammatic view of a digital printer used in practicing the invention.

For the sake of clarity, certain terms used herein may be ascribed the following definitions. The terms "raster," or "rasterize" are derived from the Latin rastrum, or "rake," and these terms are meant to refer to a method of representing an image as a two dimensional grid of pixels. The term "print job" or "job" refers to a collection of pages in a page description language (PDL) format such as PostScript or PCL, or a compressed image format, such as CCITT, including the "job attributes," i.e., directions to the raster image processor for printing the pages of the print job, such as media size and color, font, and the like. The term "raster image processor" or "RIP" refers to a collection of programs that translates a job in PDL format into a series of rasterized images and media descriptors for printing the job. The term "rendering" refers to creating a rasterized, or "rendered," image and media description from a single page of a print job. The first part of the print job submitted to the RIP is called the "print job header," which contains a series of specially formatted commands that define the job attributes. Additionally, a print job can be thought of as having a "life cycle," that may be divided into several different "job states" that span the life cycle of the print job. The first job state begins upon the job's arrival in the printer, and may be referred to as the pre-pending state. For the purposes of the present discussion, the most important job state is the "mismatch state" that exists when there is a mismatch between the job attributes and the available printer resources or capabilities.

Not all mismatches can be detected prior to rasterizing, however, because printer resources may change while the job is being rendered or because a printer may render the job and begin to print before the rendering is complete for the entire job, or because some jobs may not list all required printer resources before page one, i.e., in the job header. Therefore, such a mismatch of printer resources and job attributes may be discovered only after the job is partially rendered. Thus, at some point during rendering, it will become apparent that the entire job will not print properly because of a mismatch state that was not detected prior to rendering. After this point, further rendering is waste of time and printer processor resources.

While the following is not intended to be an exhaustive list, some examples of specific mid-job mismatches include an illegal combination of media sizes being sent to a finishing device that won't tolerate that particular combination, e.g., ledger-sized media sent to a booklet maker after earlier pages of the job have specified letter-sized media. The booklet maker is unable to process such a combination of media sizes, creating a mismatch. In this example, the job header may have specified letter-sized media, but individual pages in the job specified ledger-sized media. A second example of a mid-job mismatch may be caused by an illegal media size being sent to a finishing device that is unable to process media of the requested size, e.g., the print job specifies that a ledger sized page is to be sent to a stapler but the stapler is unable to process ledger sized media. A third example is where a print job includes a request for a finishing device that has not been installed on the printer, e.g., a particular page is to be directed to a booklet maker but the printer does not have a booklet maker installed. Finally, a mid-job mismatch may result from a request for a finishing operation that the finishing device to which the page is directed can not perform, e.g., a page directed to a stacker requests stapling when the stacker has no stapling capabilities.

Presently, should a currently available printer discover a mismatch during the rendering process, there are essentially three options for reacting to the mismatch, each of which has drawbacks. First, the printer may ignore the cause of the mismatch. The result is that the job author's request is ignored but no indication is given to the printer operator of the problem. The customer will undoubtedly be disappointed by having some of the pages printed on media of incorrect size. Second, the printer may ignore the mismatch. The likely result of this strategy is a printer jam, since the mismatch will likely cause unacceptable media to be fed into a device incapable of processing media of that size. A third option is to cancel the printjob. However, this option has the disadvantage of not providing any information to the operator concerning the job status, such as why rendering has been terminated. Worse, should this printer be one that can start printing before the rendering process is complete, the operator may assume that the pages printed prior to cancellation constitute the entire job and ship the partial output to the customer as a completed job.

Turning to specifics and referring to FIG. 1, a typical print system 10 of the type employing the present invention includes a printer 20 having a user interface 21 and network interface 22 connecting the printer 20 to a network 28. The printer 20 includes a raster image processor 26 that receives incoming data from the network 28. The printer 20 also includes a marking engine 40, that incorporates a plurality of available media supplies, and other standard paper handling and processing equipment necessary, for example, for producing printed images on output paper. Additionally, the printer 20 may be connected to one or more finishing devices 30 such as stapler, stacker, booklet maker, 3-hole punch and the like.

While the exemplary print system 10 shown is a network printing system intended to receive remote input through a network connection, other configurations are contemplated and possible within the scope of the present invention. For example, the printing system could be a stand alone printer, including a scanner for on-site image input. Additionally, the printer could be connected to a scan workstation, with the calculated layout displayed for operator approval upstream of the printer. While a particular printer configuration is discussed herein, it is to be understood that the present invention may be incorporated in other printing system configurations. Moreover, while term "printer" is used throughout this discussion, it is to be understood that the present invention applies as well to electrographic copiers and all references to "printers" herein are to be understood to include copiers, as well.

Figure 2:
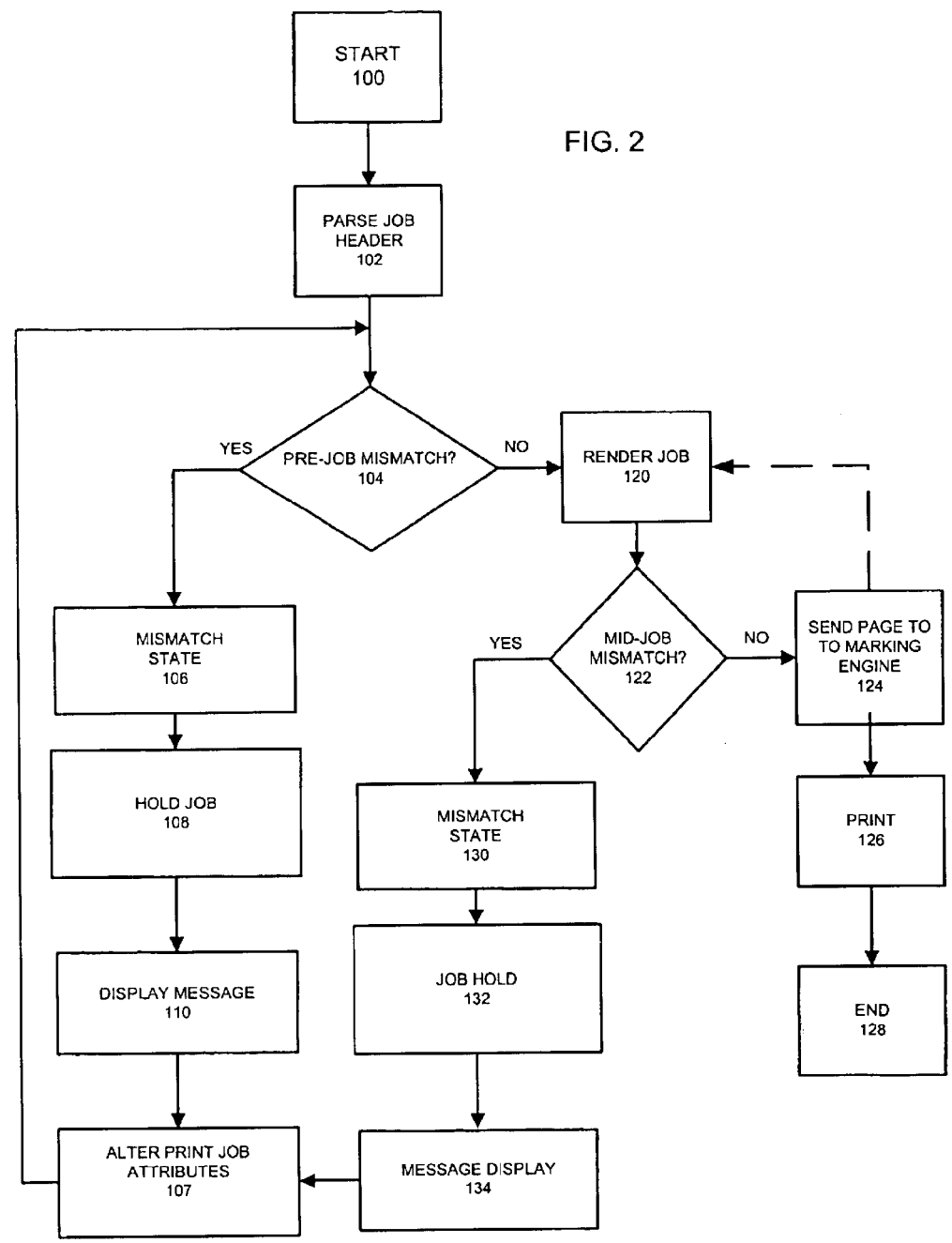
FIG. 2 presents a flow chart illustrating an embodiment of the invention.

A preferred embodiment of the method of the present invention is demonstrated by the flowchart depicted in FIG. 2. The method includes receiving a print job from the network at Step 100. In Step 102 the print job header is parsed, and the print job attributes determined. Step 104 is a pre-job mismatch check, and inquires whether there is a mismatch between any of the print job attributes specified in the job header and the available printer resources and capabilities. In practice, the pre-job mismatch check is a series of inquiries, one directed to each of the job attributes specified in the job header to determine whether the printer is capable of supporting that particular attribute. If a negative response is received to any of the inquiries of Step 104, Step 106 initiates a pre-job mismatch state, Step 108 places the print job on hold and Step 110 displays a message indicating the existence and nature of the mismatch state on the printer user interface.

If affirmative responses are received to the inquiries in Step 104, Step 120 begins to render each page of the job individually. As each page of the job is rendered by Step 120, Step 122 inquires for each page, whether any mismatch exists concerning the attributes of each individual page and the available printer resources and capabilities. If no mismatches are detected, the page is sent to the marking engine for printing in Step 124, and Steps 120, 122 and 124 are repeated for each page. If no mismatches are detected on any of the pages of the job, after the entire job has been rendered and sent to the marking engine, Step 126 prints the entire job and Step 128 is the end. Alternatively, the pages may be printed as they are rendered, either as each page is rendered or in groups of pages, rather than rendering all of the pages before printing the entire job.

However, if a mismatch is detected, Step 130 initiates a mid-job mismatch state, Step 132 places the job on hold and rendering is halted without rendering the remaining pages of the print job. In Step 134, a message is displayed on the printer user interface informing the operator of the existence and nature of the mismatch state.

In the case of mid-job mismatches, recovery necessarily requires the operator to change the print job attributes to conform to the printer resources available, and to completely re-render the print job. Thus, whether remedial action by the operator is possible is dictated by the conformation of the particular printer. For example, if the printer allows for operator modification of print job attributes, the operator may then re-configure the attributes and the job may be re-rendered and printed to completion. If the printer allows the operator to alter the print job attributes to remove the mismatch, in Step 107 the operator alters the print job attributes. Step 104 is then repeated until no mismatches are detected, after which the entire job will be rendered and sent to the marking engine.

If, however, the printer does not allow the operator to alter the job attributes through the printer user interface, the operator cannot resolve the mismatch, and it will be necessary to refer the job back to its author for remediation of the mismatch. The present invention makes this easier, in that the information displayed on the printer user interface provides the operator with the necessary information to communicate to the print job author the exact nature of the mismatch, so that the author can modify the print job attributes or the print job to header to resolve the mismatch.

Several definitions are necessary to understand the following example. A "log_i18n message" is a function used to notify the user of a given condition via a printer user interface or log file. The "isLegalPage" function checks to determine if the page size is a legal size, that is, whether the page size is one supported and supplied by the printer. This function checks each page header to detect specified media sizes that are unsupported by the printer. Code for the "isLegalPage" function is set forth in Table I.

TABLE I

```
*/
T_bool
PageQueue::isLegalPage(CDH_Page_Information* new_p, char * explanation_p)
{
    assert(new_p);
    assert(mPage_p->mReq_p);
    T_bool          legal_page        =         TRUE;
    CDH_Page_Information*   old_p     =         getPgInfoTail( );
    // first page of a job
    if (old_p == 0) {
        // set media sizes to the values of the first page header of the job.
        mInTrack     = new_p->header.media.x;
        mCrossTrack  = new_p->header.media.y;
    }
    // If first page, or if this page differs from the previous . . .
    if (old_p == 0
        || (new_p->header.media.x              != old_p->header.media.x
            || new_p->header.media.y           != old_p->header.media.y
            || new_p->header.interleaf_media.x != old_p->header.interleaf_media.x
            || new_p->header.interleaf_media.y != old_p->header.interleaf_media.y
            || new_p->header.output_destination != old_p->header.output_destination
            || new_p->header.useModalFinishing   != old_p->header.useModalFinishing
            || mFinishingOperations.isChangedFinishingOperationInPageHeader(old_p-
>header, new_p->header))) {
        // assume destination is job destination unless proven otherwise
        Mec_Output_Option pageDestination = mPage_p->mReq_p->OutputMedia;
        if (new_p->header.output_destination != ME_DEFAULT_OUTPUT) {
            pageDestination = new_p->header.output_destination;
        }
        // get finishing device object
        FinishingDevice& finDev = mFinishingDeviceList.getFinishingDevice(
pageDestination);
        // verify destination is connected and enabled
        if (!finDev.isPresentAndActivated( )) {
            sprintf(explanation_p, "%s is either deactivated or not present.",
                finDev.getName( ));
            legal_page = FALSE;
            mJob.addMidJobMismatch(MMM_OUTPUT_MISSING, new_p-
>header.page_number, pageDestination);
        }
        // verify that the finishing device in use will work with the present media:
        if (!finDev.isMediaSizeCapable(new_p->header.media.x, new_p->header.media.y)
) {
            sprintf(explanation_p, "Invalid media for %s.", finDev.getName( ));
            legal_page = FALSE;
            mJob.addMidJobMismatch(MMM_MEDIA_SIZE, new_p->header.page_number,
pageDestination);
        }
        // verify that the mix of media in this job will work in this finishing device.
        if (old_p !=0
            && ((finDev.isConstantInTrack( )    && (new_p->header.media.x != mInTrack))
                || (finDev.isConstantCrossTrack( ) && (new_p->header.media.y !=
mCrossTrack)))) {
            sprintf(explanation_p, "Invalid media mix for %s.", finDev.getName( ));
            legal_page = FALSE;
            mJob.addMidJobMismatch(MMM_MEDIA_SIZE_MIX, new_p-
>header.page_number, pageDestination);
        }
        // verify that the finishing device in use can execute the finishing operations required.
        if (mFinishingOperations.isIllegalFinishingOperation(new_p->header, finDev)) {
            sprintf(explanation_p, "Illegal %s finishing operation.", finDev.getName( ));
            legal_page = FALSE;
            mJob.addMidJobMismatch(MMM_ILLEGAL_FINISHING_OPERATION,
new_p->header.page_number, pageDestination);
        }
        // verify that no attempt is made to punch an unpunchable media
        if ((new_p->header.punchPattern != 0)
            && (new_p->header.media.isUnpunchable)) {
            mJob.addMidJobMismatch(MMM_INOPERABLE_MEDIA, new_p-
>header.page_number, ME_HOLE_PUNCH);
        }
    }
    if (!legal_page) {
        log_i18n_message("FATAL_ERROR_PAGE", new_p->paper_exception_page);
    }
    return legal_page;
} /* endfunc isLegalPage( ) */
```

The "isLegalFinishingOperation" function tests to see if a page specifies a certain finishing device or operation that is not supported by the printer. Code for the "isLegalFinishingOperation" function is set forth in Table II.

TABLE II

```
T_Bool
FinishingOperations::isIlegalFinishingOperation(const Jm_Page_Header& newPH, const
FinishingDevice& finDev)
{
    return (((newPH.staple_position    == SP_STAPLES_TOP
            || newPH.staple_position == SP_STAPLES_BOTTOM
            || newPH.staple_position == SP_STAPLES_BOTH)
           && !finDev.isFinOpCapable(FINOP_STAPLE))
          ||(newPH.isJog        && !finDev.isFinOpCapable(FINOP_STACK))
          ||((newPH.staple_position == SP_STAPLES_SADDLE)
              && (!finDev.isFinOpCapable(FINOP_SADDLE_STITCH)))
          ||(newPH.isTrim       && !finDev.isFinOpCapable(FINOP_TRIM))
          ||(newPH.isFold       && !finDev.isFinOpCapable(FINOP_SADDLE_FOLD
))
            // hole punch not yet handled until inline finishing devices can communicate with
the destination finishing devices.
            // ||((newPH.punchPattern != 0) && !finDev.isFinOpCapable(
FINOP_HOLE_PUNCH))
             );
}
void
```

Finally, the "addMidJobMismatch" function records the nature of the mismatch and the page on which the mid-job mismatch occurred, and is the first step in a series of functions and processes that eventually result in a message being displayed on the user interface. Code for the addMidJobMismatch function is set forth in Table III.

TABLE III

```
Job::addMidJobMismatch(Mismatch_Reason mismatch_reason, Uint16 pageNum,
Mec_Output_Option output)
{
    assert(output != ME_DEFAULT_OUTPUT && "Job::addMidJobMismatch");
    assert(pageNum > -1 && "Job::addMidJobMismatch");
    Mismatch::setMismatch (&mJobQueueEntry.record[0], mismatch_reason);
    mJobQueueEntry.midJobMismatchPageNumber    = pageNum;
    mJobQueueEntry.midJobDevice                = output;
    mMismatch.display_current_match(&mJobQueueEntry.record[0], "midjob mismatch"
);
}
```

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more, fewer or other elements may be used in the block diagrams.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

We claim:

1. A method for printing comprising:
   submitting a print job to printer;
   rendering at least one page of the print job;
   detecting in the rendered page a mismatch between print job attributes used by the print job and available printer resources;
   suspending the print job pending the resolution of the mismatch;
   detecting a resolution of the mismatch; and
   resuming the print job.

2. A computer readable medium having stored therein instructions for causing a central processing unit to execute the method of claim 1.

3. The method of claim 1, further comprising:
 displaying an indication of the existence and nature of the mismatch on a user interface.

4. The method of claim 1, wherein resuming the print job includes:
 rendering remaining pages in the print job; and
 sending the remaining pages to a marking engine in order to complete the print job.

5. The method of claim 1, wherein resuming the print job includes:
 rerendering the entire print job; and
 sending the print job to a marking engine in order to complete the print job.

6. A method for handling a mid-job mismatch, the method comprising:
 receiving a print job;
 individually rendering each page of the print job;
 for each rendered page of the print job, determining if there is a mismatch between print job attributes used by the rendered page and available printer resources;
 detecting a mismatch between at least one of the rendered pages and available printer resources;
 holding the printer job until the mismatch is resolved;
 detecting a resolution of the mismatch; and
 rendering remaining pages in the print job.

7. A computer readable medium having stored therein instructions for causing a central processing unit to execute the method of claim 6.

8. The method of claim 6, wherein detecting a resolution of the mismatch comprises detecting a reconfiguration of at least one print job attribute.

9. The method of claim 6, wherein detecting a resolution of the mismatch comprises:
 referring the print job back to an author for remediation of the mismatch; and
 receiving a new print job.

10. The method of claim 6, further comprising outputting an indication of a cause of the mismatch on a user interface.

11. A method for resolving print job mismatches, the method comprising:
 receiving a print job;
 parsing a header of the print job in order to determine print job attributes used by the print job;
 determining there is not a mismatch between the print job attributes specified in header and available printer resources;
 rendering at least one page of the print job;
 detecting a mismatch of the at least one page of the print job;
 suspending the print job pending resolution of the mismatch;
 displaying on a user interface a message indicating a nature of the mismatch;
 detecting a change in at least one of the print job attributes; and
 resuming the print job in order to complete the print job.

12. A computer readable medium having stored therein instructions for causing a central processing unit to execute the method of claim 11.

13. The method of claim 11, wherein resuming the print job comprises rendering remaining pages in the print job.

14. The method of claim 11, wherein resuming the print job comprises rerendering the entire print job.

15. The method of claim 11, wherein resuming the print job comprises rendering remaining pages in the print job.

16. A method for printing comprising the steps of:
 submitting a print job to printer;
 partially rendering the print job;
 detecting in the rendered part of the print job a mismatch between print job attributes used by the print job and available printer resources;
 halting rendering of the remainder of the print job.

* * * * *